US005813257A

United States Patent [19]

Claghorn et al.

[11] Patent Number: 5,813,257

[45] Date of Patent: Sep. 29, 1998

[54] ELECTRICALLY CONTROLLABLE LOCKING DEVICE FOR VENDING MACHINES AND THE LIKE

[75] Inventors: Roger O. Claghorn, St. Louis; Joseph L. Levasseur, Chesterfield, both of Mo.

[73] Assignee: Coin Acceptors, Inc., St. Louis, Mo.

[21] Appl. No.: 882,093

[22] Filed: Jun. 25, 1997

[51] Int. Cl.$^6$ .................................................... B60R 25/02

[52] U.S. Cl. ................................ 70/208; 70/275; 70/282; 292/201

[58] Field of Search ............................ 70/208, 275, 277, 70/278, 280–283; 292/144, 201

[56] References Cited

U.S. PATENT DOCUMENTS

| | | | |
|---|---|---|---|
| 1,880,850 | 10/1932 | Dautrick | 70/282 |
| 2,105,350 | 1/1938 | Fitzgerald | 70/283 X |
| 3,794,339 | 2/1974 | Smolka | 70/282 X |
| 3,805,566 | 4/1974 | Tucker | 292/201 X |
| 3,834,198 | 9/1974 | Wiczer | 70/208 |
| 4,111,473 | 9/1978 | Bourrie et al. | 292/201 X |
| 4,167,104 | 9/1979 | Bond | 70/208 |
| 4,760,721 | 8/1988 | Steinbach | 70/208 |
| 4,793,640 | 12/1988 | Stewart, Sr. | 292/201 |
| 4,893,704 | 1/1990 | Fry et al. | 292/201 X |
| 4,947,968 | 8/1990 | Slavin et al. | 70/282 X |
| 4,986,098 | 1/1991 | Fisher | 292/201 X |
| 5,290,076 | 3/1994 | Smith | 292/201 X |
| 5,497,641 | 3/1996 | Linde et al. | 70/277 X |
| 5,640,863 | 6/1997 | Frolov | 70/283 |

FOREIGN PATENT DOCUMENTS

| | | | |
|---|---|---|---|
| 119133 | 9/1984 | European Pat. Off. | 292/201 |
| 159238 | 10/1985 | European Pat. Off. | 292/201 |
| 2554898 | 5/1985 | France | 70/275 |
| 2903285 | 8/1980 | Germany | 292/201 |
| 3084181 | 4/1991 | Japan | 20/275 |

*Primary Examiner*—Suzanne Dino
*Attorney, Agent, or Firm*—Haverstock, Garrett & Roberts

[57] ABSTRACT

An electrically controllable locking device includes a lock stud having at least one groove formed thereon. A motor assembly having a rotatable shaft extending therefrom is provided with a cam member mounted on the motor assembly shaft. The cam member includes a cam surface with a slot formed therealong. A latch member has a first portion which is biased toward the lock stud and engages the lock stud groove when the locking device is in a locked arrangement. The latch member also has a second portion which is biased toward the cam member and is positioned to contact at least a portion of the cam surface during rotation of the cam member. In one embodiment, the lock stud is a lock barrel of a T-handle lock assembly.

14 Claims, 7 Drawing Sheets

ELECTRICALLY CONTROLLABLE LOCKING DEVICE FOR VENDING MACHINES AND THE LIKE

FIELD OF THE INVENTION

This invention relates generally to locks used in vending machines and more particularly, to an electrically controllable locking device for use in securing a vending machine door to a vending machine cabinet.

BACKGROUND OF THE INVENTION

Lock handle assemblies such as that disclosed in U.S. Pat. No. 4,760,721 are commonly utilized in vending machines for securing the vending machine cabinet door to the vending machine cabinet. Such lock handle assemblies typically include a T-handle member including a handle portion having a lock barrel extending therefrom. The lock barrel is spring loaded within a lock barrel guide of a handle flange which also includes a recess into which the handle portion of the T-handle member may be lockingly secured by a key operated lock which is positioned within the lock barrel. Such lock handle assemblies have proven relatively effective at securing vending machines. However, although difficult, it is possible for such lock handle assemblies to be picked. Further, persons might obtain a copy of the key without authorization. A person with an unauthorized copy of a key may then be able to repeatedly gain access to a large number of vending machines without the knowledge of the proprietor of such vending machines.

Attempts to increase vending machine security in order to address such problems have been made in the past. For example, U.S. Pat. No. 4,167,104 describes a solenoid enabled lock which is configured for use in association with lock handle assemblies. The problem with such a solenoid type lock is that a relatively large solenoid is needed, limiting its use in some vending machines where space limitations exist. Further, a high current is needed to operate the solenoid type lock. Normally when a vending machine is connected to an external power source this high current requirement does not present a problem. However, if the external power source is unavailable or fails, it is still necessary to have the ability to open the vending machine.

Accordingly, it is desirable and advantageous to provide an electrically controllable locking device having a reduced space requirement and a relatively low current requirement, for use in association with T-handle lock assemblies. It is also desirable and advantageous to provide an electrically controllable locking device which does not require association with a T-handle lock assembly for operation.

An object of the present invention is to provide an electrically controllable locking device which is relatively small.

Another object of the present invention is to provide an electrically controllable locking device which can be operated by a relatively low level of current.

Yet another object of the present invention is to provide an electrically controllable locking device which may be operated by standard battery power.

Another object of the present invention is to enable a standard T-handle lock assembly to be modified to include an electrically controllable locking device of the present invention.

SUMMARY OF THE INVENTION

These and other objects of the invention are attained by an apparatus which, in one embodiment, is an electrically controllable locking device adapted for use in association with a T-handle lock assembly for securing a vending machine cabinet door to a vending machine cabinet. Such a lock assembly typically includes a handle formed integrally with a handle lock barrel having an outer surface and a lock bolt extending from an end thereof. The lock bolt has an interiorly threaded end for threadedly engaging an interior portion of the vending machine cabinet. The handle lock barrel is positioned within a lock guide formed integrally with a handle flange which includes a handle recess into which the handle may be positioned. The electrically controllable locking device of the present invention includes at least one groove formed in the outer surface of the handle lock barrel so that the lock barrel acts as a lock stud of the device. A motor assembly having a rotatable shaft extending therefrom is provided with a cam member, which may be formed from plastic, mounted on the motor assembly shaft. A latch member, which may be formed from metal or other high strength material for example, has a first portion which is biased toward the lock barrel and is positioned within the lock barrel groove when the handle is positioned within the handle recess of the handle flange. The latch member also has a second portion which is biased toward the cam member and is positioned to contact at least a portion of the cam surface during rotation of the cam member. A pivot point is provided between the first and second portions of the latch member. When a current is delivered to the motor assembly the cam member rotates and the cam surface engages the second portion of the latch member causing the latch member to pivot about the pivot point such that the first portion of the latch member is moved out of the lock barrel groove.

In another embodiment, a T-handle lock is not utilized. Rather, when the cabinet or vending machine door is closed a portion of the latch member of the electrically controllable locking device is positionable within a groove of a lock stud which extends inwardly from the vending machine door. The lock stud does not form part of a T-handle lock assembly and therefore can take on a variety of shapes.

In both embodiments, the electrically controllable locking device may be operatively connected to a card reading device for control thereby, the card reading device operable to effect delivery of a current to the motor assembly in response to information encoded on a key card inserted into the card reading device. The card reading device may also be programmed to keep track of certain MIS data such as how often the electrically controlled lock is utilized. This feature would provide a vending machine proprietor with sufficient information to determine if someone was accessing the vending machine illegally, such as by use of a stolen or copied key card. The card reading device which controls the lock may also include a back-up, internal power source, such as a standard 9 volt battery, for providing current to operate the locking device in the event of some type of power failure or power interruption.

DETAILED DESCRIPTION OF THE DRAWINGS

Figure 1:
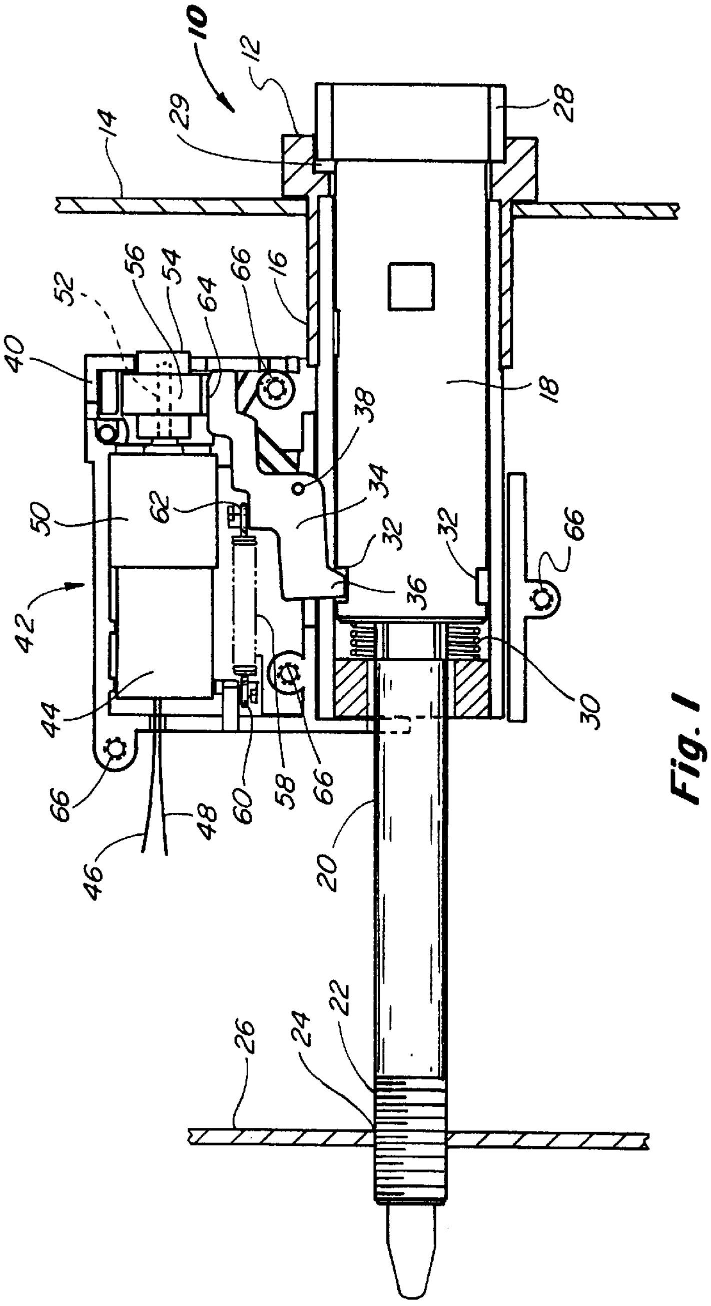
FIG. 1 is a fragmentary side elevation view, partially in cross section, of a lock handle assembly including one embodiment of the electrically controllable locking device of the present invention.

Referring now to the drawings, number 10 in FIG. 1 depicts a lock handle assembly as installed within a vending machine, the assembly having an electrically controllable locking device of the present invention associated therewith. The assembly includes a handle flange 12 attached to a vending machine cabinet door 14, the handle flange 12 having a lock barrel guide 16 integral therewith and extending inwardly therefrom. Spring loaded within the lock barrel guide 16 is a lock barrel 18 having a lock bolt 20 associated with the inward end thereof, which lock bolt includes an inwardly threaded portion 22 which is threaded into a corresponding threaded opening 24 of a vending machine interior member 26 such as a bracket. A handle 28 of the lock barrel is positioned within a recess 29 of the handle flange 12. A compression spring 30 is positioned within the lock barrel guide and exerts a force which urges the lock barrel outward, to the right in FIG. 1, so that, when unlocked, the handle 28 is pushed out from the recess of the handle flange 12. The handle, lock, barrel and lock bolt may then be rotated such that the lock bolt is threaded out of the opening 24 and the cabinet door 14 can be opened. The operation and construction of such a lock handle assembly is well known and therefore need not be discussed in great detail herein.

The electrically controllable locking device of the present invention is also illustrated in FIG. 1 and includes grooves 32 formed in the outer surface of the lock barrel, such as by machining. When locked, a latch member 34 includes a first portion 36 which is positioned within the groove 32, preventing the lock barrel 18 and handle 28 from being pushed outward. The latch member 34 includes a pivot point 38 which is pivotally connected to a housing 40 of the device. For example, a pin may be provided onto which the latch member 34 is placed. Also mounted within the housing 40 is a motor assembly 42 including a motor 44 having leads 46, 48. The motor 44 is connected to gearbox 50 and a rotatable shaft 52, shown in shadow, extends from the gearbox 50. Mounted on the rotatable shaft 52 is a cam member 54 having a cam surface 56. A tension spring 58 is connected to the housing at 60 and to the latch member at 62 to pull on the latch member 34 such that the first portion 36 is biased toward the lock barrel 18. A second portion 64 of the latch member is biased toward the cam member 54. Of course, means other than tension spring 58 could be provided for biasing the latch member 34. For example, tension spring 58 could be replaced with an elastic band. Further, a properly positioned compression spring could be utilized, or a torsion spring associated with the pivot point 38 could be utilized.

Figure 11:
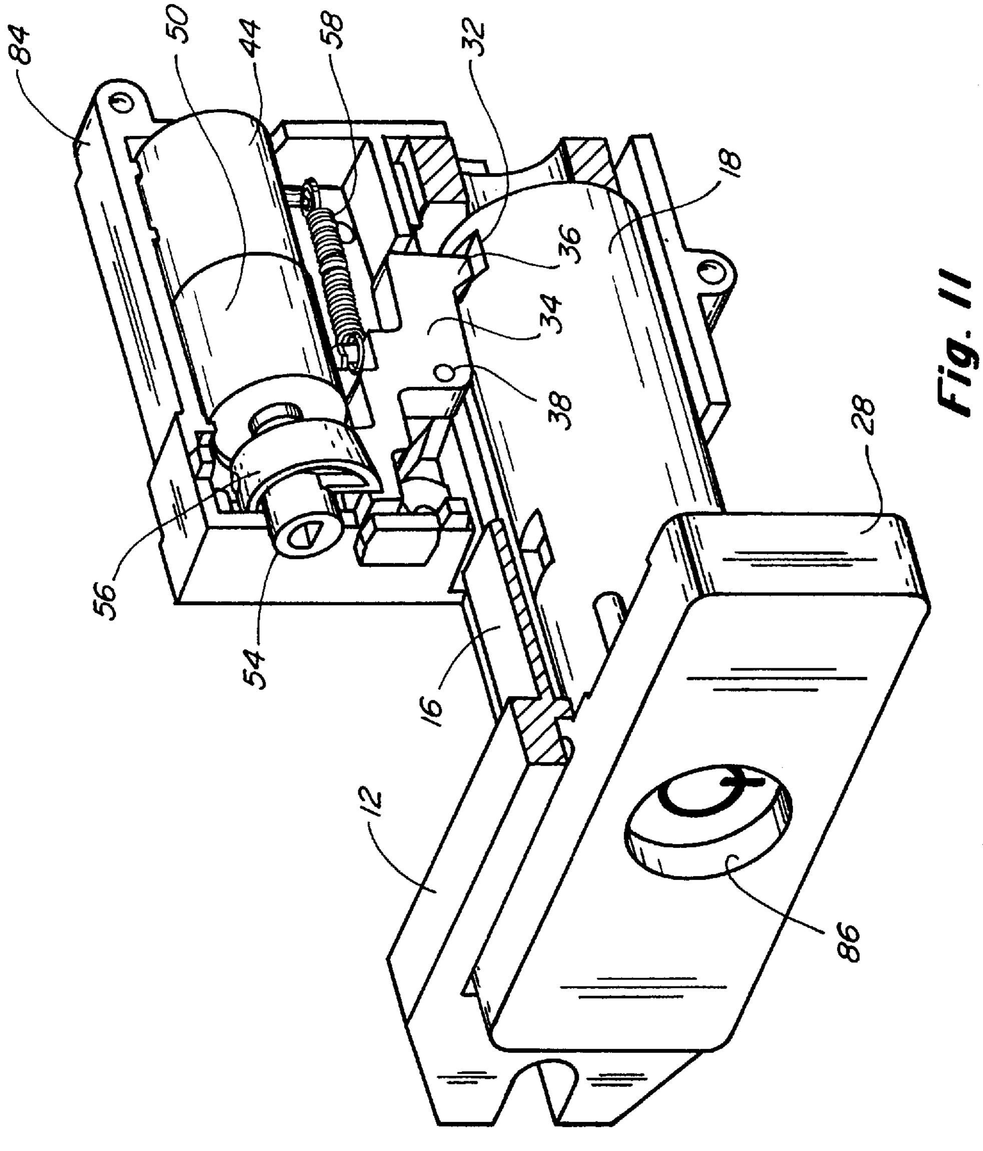
FIG. 11 is a perspective view showing the electrically controllable locking device of FIG. 1.

With respect to housing 40, a plurality of threaded holes 66 are provided for mating the housing with another housing portion which is shown in FIG. 11. When mated, the two housing portions are securely attached around the lock barrel guide 16. It is recognized that other attachment means could be provided for attaching the two housing portions together, and/or for attaching the housings to the lock barrel guide 16, such as by forming the two housing portions with interlocking portions.

Figure 4:
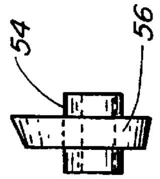
FIG. 4 is a side view of FIG. 2.
Figure 3:
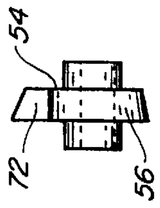
FIG. 3 is a side view of FIG. 2.
Figure 2:
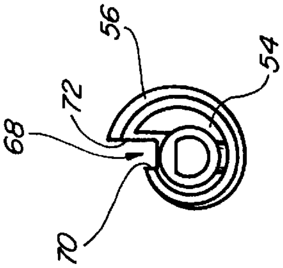
FIG. 2 is a side view of the cam member of the electrically controllable locking device of FIG. 1.

An end view of the cam member 54, looking from the left side in FIG. 1, is illustrated in FIG. 2. A slot 68 is formed along the cam surface 56. Further, as shown in the side views of FIGS. 3 and 4, the cam surface 56 can be tapered from side to side of the cam member. Specifically, referring to FIG. 2, the taper of the cam surface increases moving counterclockwise from a first sidewall 70 of slot 68 to a second sidewall 72 of slot 68. The advantage of such increasing degree of taper is described below.

Figure 5:
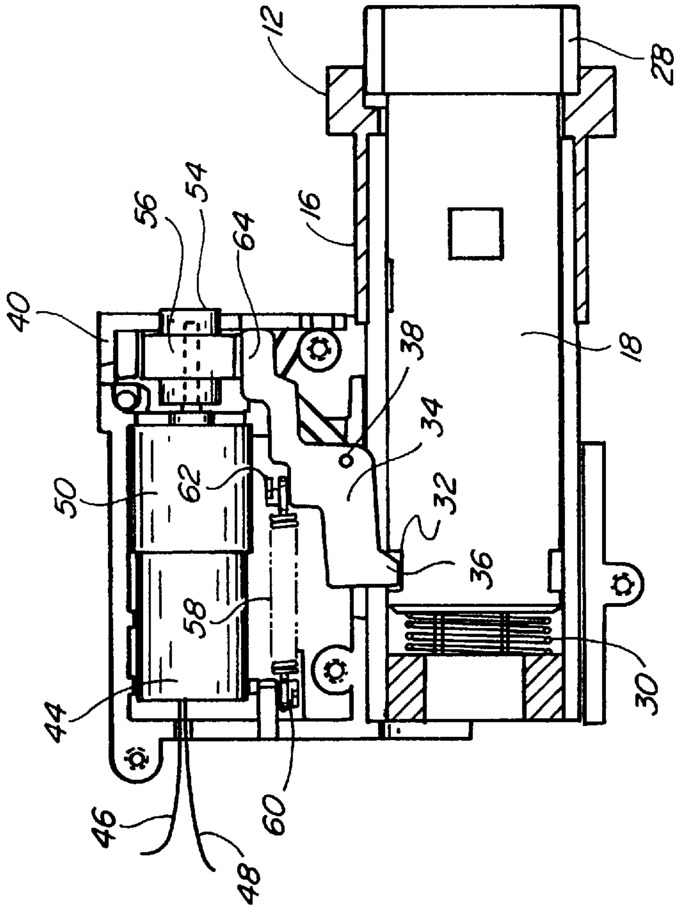
FIG. 5 is an enlarged view of the electrically controllable locking device of FIG. 1 shown in a locked position.
Figure 6:
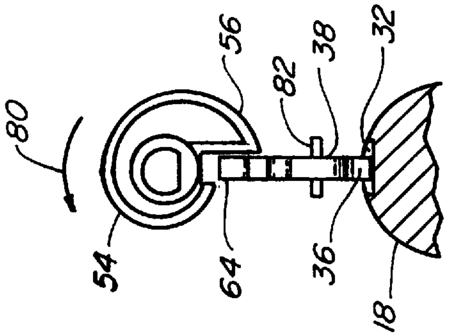
FIG. 6 is a side view illustrating the relative position of the cam member and latch member in FIG. 5.
Figure 7:
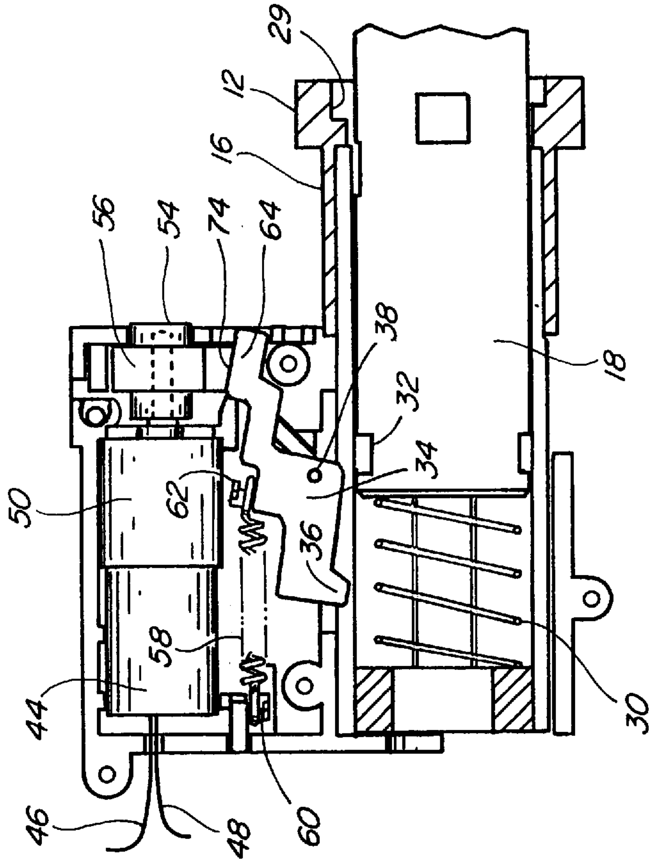
FIG. 7 is an enlarged view of the electrically controllable locking device of FIG. 1 shown in an unlocked position.
Figure 8:
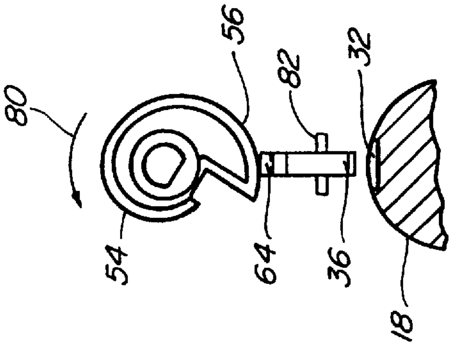
FIG. 8 is a side view illustrating the relative position of the cam member and latch member in FIG. 7.

The operation of the locking device is described with reference to FIGS. 5–10. FIGS. 5 and 6 illustrate the device when in a locked position, with portion 36 of latch member 34 positioned in groove 32. The position of the latch member 34 relative to the cam member 54 and the groove is shown in FIG. 6 which is a view of such portions from the right side of FIG. 5. In such locked position the portion 64 of latch member 34 is aligned with the slot 68 of the cam member 54 and is spaced therefrom to allow rotation of the cam member in the direction shown by arrow 80 (FIG. 6). A pin 82 is also illustrated through the pivot point 38. The portion 36 of the latch member is positioned within the groove 32.

An unlocking operation is effected by delivery of current to the motor 44 through leads 46 and 48 which causes the cam member 54 to rotate in the direction of arrow 80. As the cam member rotates the cam surface 56 engages the portion 64 of latch member 34 and pushes the portion 64 downward, as best seen with reference to FIGS. 7 and 8, and also causes the portion 36 to move upward and out of the groove 32. When the portion 36 clears the groove 32, the lock barrel 18 is then capable of being pushed outward, to the right in FIG. 7, such that the handle 28 is no longer seated within the recessed portion 29 of the handle flange 12 and can be rotated.

The advantage of the increasing taper of the cam surface 56 comes into play when the cam member 54 is rotated and the cam surface 56 engages the portion 64 of the latch member. As the portion 64 is pushed downward it pivots about pivot point 38 and the angle of a surface 74 of portion 64 which engages the cam surface 56 begins to change relative to the axis of rotation of the cam member 54. The increasing taper of cam surface 56 can be selected to increase as the angle of surface 74 increases so that contact between the two surfaces remains relatively uniform throughout the rotation of the cam member 54.

Figure 10:
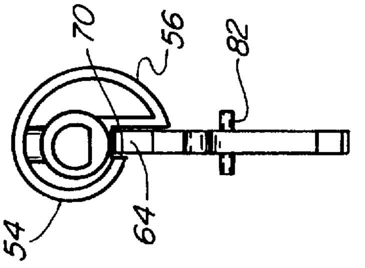
FIG. 10 is a side view illustrating the relative position of the cam member and latch member in FIG. 9.
Figure 9:
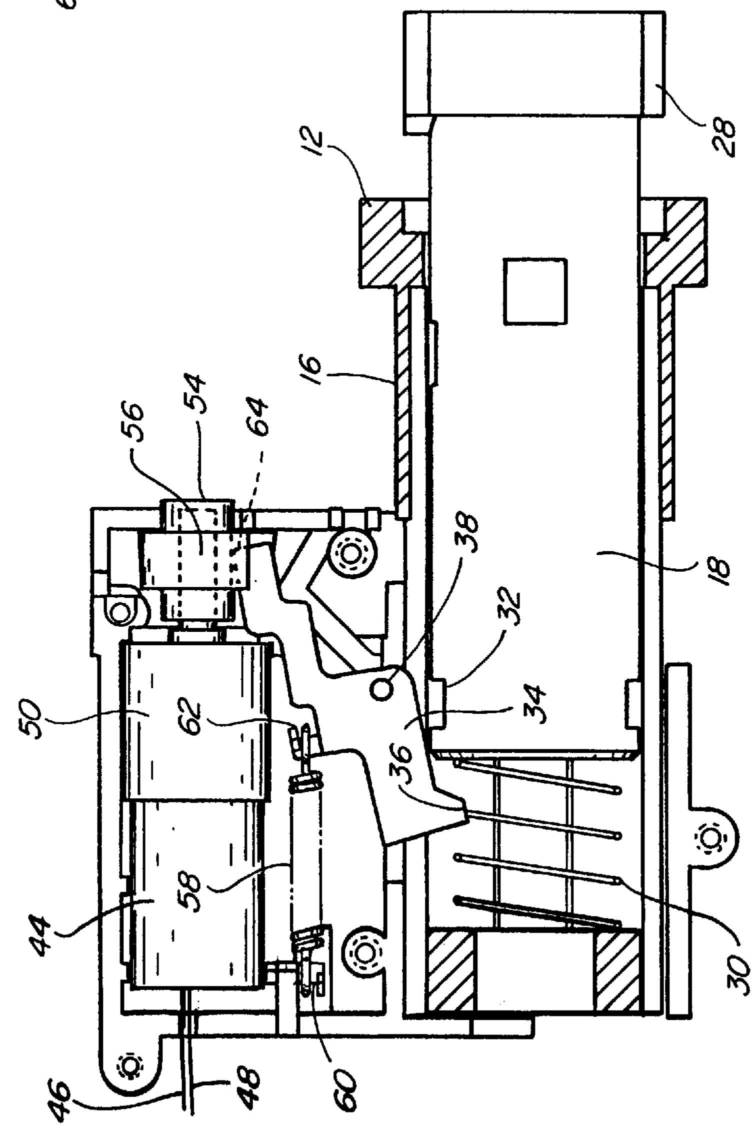
FIG. 9 is an enlarged view of the electrically controllable locking device of FIG. 1 in an unlocked, stall position.

During an unlocking operation, the cam member 54 continues to rotate until, as shown in FIGS. 9 and 10, the portion 64 of latch member 34 aligns with the slot 68 of cam member 54 and is pulled therein due to the biasing of spring 58. This positioning of portion 64 prevents further turning of the cam member due to the engagement of portion 64 with sidewall 70 of the slot 68. When the lock barrel 18 is again pushed inward, to the left in FIG. 9, the locking device is re-locked, and oriented as illustrated in FIGS. 5 and 6.

Providing a slot 68 in the cam member 54 allows the starting position of the cam member 54 to be maintained without requiring sensors or other means to keep track of the position of the cam member 54. Specifically, during an unlocking operation a current is delivered to the motor 44 for a period of time which allows the cam member 54 to rotate one time until the portion 64 of latch member 34 becomes positioned within the slot 68. Even though current may continue to be delivered to the motor 44, the engagement of portion 64 with the slot 68 prevents further rotation of the cam member 54. Delivery of the current is then stopped, so that when the lock barrel 18 is again pushed inward, the cam member will not rotate when the portion 64 moves out of the slot 68, unless another unlocking operation is initiated.

A perspective view of the locking device of the present invention is illustrated in FIG. 11, including housing portion 84 which mates with the housing portion 40. Handle 28 includes lock barrel 18 extending therefrom in typical T-handle fashion. An opening 86 within the front face of the handle 28 is typically provided with a key lock therein, and the present invention could be used as a compliment to such a key lock. However, it is also understood that a solid T-handle/lock barrel combination could be provided without any key lock. In the event that opening 86 is included in a particular device, it is preferred that grooves 32 be machined into the outer surface of the lock barrel 18, but that they not be formed through to the interior of the lock barrel. Such a configuration reduces the possibility that the locking device might be picked by accessing the latch member portion 36 through opening 86.

The present invention enables existing T-handle lock assemblies to be modified so as to enable the locking device to be included therewith. Specifically, the housings 40 and 84 and the associated motor 44, gearbox 50, cam member 54, latch member 34 and spring 58 may all be provided in a kit. Upon installation, the existing lock barrel may be machined to include the grooves 32. Alternatively, the kit may include a replacement handle/lock barrel having the grooves 32 already formed therein.

The electrically controllable locking device described above is preferably controlled by a card reading device using a key coded card. The exact type of card and corresponding card reading device is not critical and many such types are known, including magnetic stripe, IC chip cards with contacts, and IC chip cards which are readable by inductive means.

Figure 12:
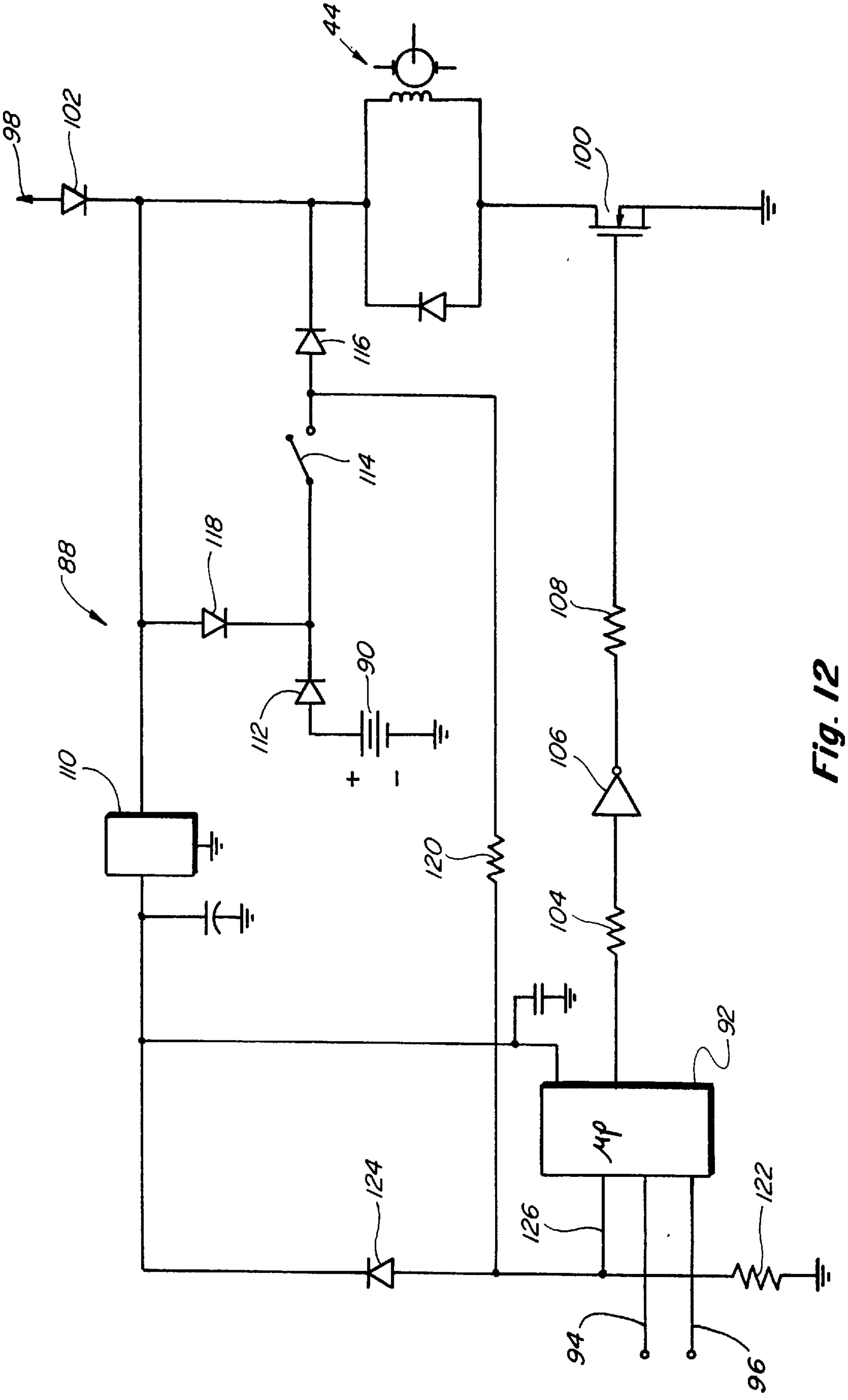
FIG. 12 is a partial schematic illustration of a card reading device operable to control the locking device of the present invention.

A schematic, partial illustration of a card reading device 88 including a back-up battery 90 for such purposes is illustrated in FIG. 12. A microprocessor 92 of the card reading device is operatively connected to receive input information from a card inserted therein at line 94. Similarly, output information may be provided to the card at line 96. Power originating from an external source is typically provided at line 98 and may be on the order of +12 volts, in which case a battery 90 on the order of +9 volts may be selected. The motor 44 is connected between the power source and a transistor 100, a diode 102 being connected between the power source and the motor 44. The microprocessor 92 is connected to control the ON/OFF switching of the transistor 100 according to information received at line 94 from a key coded card, such connection to the transistor 100 being through resistor 104, buffer 106, and resistor 108. A voltage regulator 110 is connected between the power source and the microprocessor for providing a regulated voltage thereto, such as +5 volts.

Diode 112 is connected between the battery 90 and a switch 114, the switch being normally open and closing when a card is inserted into the card reading device. A diode 116 is connected between one side of the switch 114 and the motor 44, and a diode 118 is connected between the diode 102 and the opposite side of switch 114. Resistors 120 and 122 are connected between the switch and ground. Diode 124 is connected between the voltage regulator 110 and resistor 122, and prevents the voltage at line 126 from exceeding the regulator 110 voltage by forward biasing when switch 114 is closed.

In normal operation, with +12 volts supplied at 98 and a +9 volt battery 90, diode 112 cannot turn on. When a card is inserted the switch 114 closes and a voltage is applied to the microprocessor at line 126 indicating such card insertion. In response to information received from the card on line 94, the microprocessor turns on transistor 100, delivering a current to the motor 44 from line 98. In the event of a power problem, for example a power outage, no voltage will be supplied at line 98. When a card is then inserted, switch 114 closes, diode 112 turns on, and a voltage will be applied to the microprocessor at line 126 indicating such card insertion. In response to information received from the card on line 94, the microprocessor turns on transistor 100, delivering a current to the motor 44 from the battery 90 through diodes 112 and 116.

Regardless of whether the delivered current comes from line 98 or battery 90, the microprocessor 92 may be programmed to turn transistor 100 on for a predetermined period of time which is sufficient to rotate the cam member 54 one time (about 360 degrees). The previously described configuration of cam member 54 allows such predetermined period of time to be selected slightly longer than required to rotate cam member 54 one time. Specifically, the inclusion of slot 68 limits the rotation of cam member 54 to about 360 degrees for each unlocking operation as desired.

Figure 13:
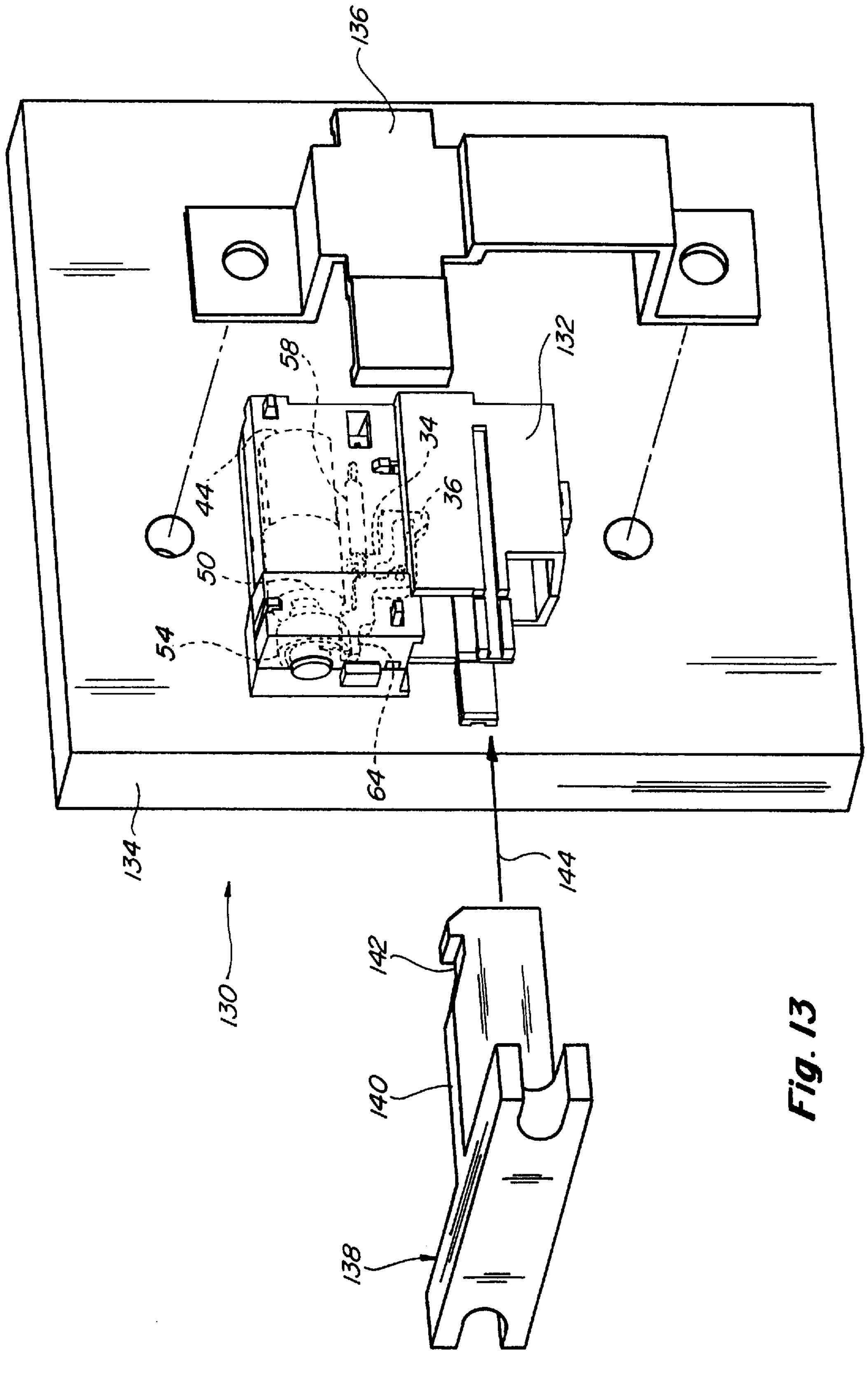
FIG. 13 is a perspective view of an alternative embodiment of the electrically controllable locking device of the present invention.

An alternative embodiment of an electrically controllable locking device 130 is illustrated in FIG. 13. The locking device 130 includes elements which are substantially similar to those described above with reference to FIGS. 1–11. In particular, the locking device includes a motor assembly including a motor 44, gearbox 50 and cam member 52 mounted on a shaft of the assembly for rotation when a current is delivered to the motor 44. The cam member 52 includes a cam surface with a slot therein as previously described, and a latch member 34 includes a portion 64 configured for insertion in the cam member slot. These components are positioned within a housing 132 as shown, and the housing 132 can be attached to an interior portion 134 of a vending machine cabinet by means of a bracket 136 which is configured to engage and hold the housing 132 in place. A lock member 138 is adapted for attachment to a vending machine door such that a lock stud portion 140 thereof extends inwardly, the lock stud portion 140 including a groove 142 formed therein. The lock member 138 should be positioned on the cabinet door such that when the door is closed the lock stud portion 140 of the lock member 138 extends into the housing 132, as indicated by arrow 144, so that the portion 36 of the latch member 34 is positioned within the groove 142 in order to secure the cabinet door in a closed position. An unlocking operation for the device 130 is substantially the same as described above with reference to FIGS. 5–9 and 11.

From the preceding description of the illustrated embodiment, it is evident that the objects of the invention are attained. In particular, a relatively small electrically controllable locking device which does not require a high level current for operation has been provided. Further, a device which can be utilized to modify a standard T-handle lock assembly to include an electrically controllable locking feature has been provided. Although the invention has been described and illustrated in detail, it is to be clearly understood that the same is intended by way of illustration and example only and is not to be taken by way of limitation.

For example, the electrically controllable locking device could be operated by a device other than a card reading device, such as by manual entry of an access code. Further, it is understood that other motor assembly variations could be utilized. Accordingly, the spirit and scope of the invention are to be limited only by the terms of the appended claims.

What is claimed is:

1. An electrically controllable locking device adapted for use in association with a lock assembly for securing a cabinet door to a cabinet, the lock assembly including a handle formed integrally with a handle lock barrel having an outer surface and a lock bolt extending from an end thereof, the lock bolt having an interiorly threaded end for threadedly engaging an interior portion of the cabinet, the handle lock barrel positioned within a lock guide formed integrally with a handle flange which includes a handle recess into which the handle may be positioned, said electrically controllable locking device comprising, at least one groove formed in the outer surface of the handle lock barrel;

a motor assembly having a rotatable shaft extending therefrom;

a cam member mounted on the motor assembly shaft for rotation therewith, the cam member including a cam surface; and a latch member having a first portion which is biased toward the lock barrel and is positioned within the lock barrel groove when the handle is positioned within the handle recess of the handle flange, the latch member having a second portion which is biased toward the cam member and is positioned to contact at least a portion of the cam surface during rotation of the cam member.

2. The electrically controllable locking device of claim 1 wherein the cam member includes a slot positioned along the cam surface and the second portion of the latch member is configured for positioning within the cam member slot.

3. The electrically controllable locking device of claim 1 wherein the cam member includes first and second sides and at least a portion of the cam surface is tapered from side to side.

4. The electrically controllable locking device of claim 1 further comprising a housing engageable with the lock guide, wherein a pivot point of the latch member is pivotally connected to the housing, the first portion of the latch member being located to one side of the pivot point and the second portion of the latch member being located to an opposite side of the pivot point.

5. The electrically controllable locking device of claim 4 further comprising a biasing member having a first side connected to the latch housing and a second side connected to a portion of the latch member, the biasing member exerting a force on the latch member which tends to pivot the first portion of the latch member toward the lock barrel and the second portion of the latch member toward the cam member.

6. The electrically controllable locking device of claim 1 wherein the motor assembly includes a motor having a gearbox associated therewith, the motor assembly shaft extending from the gearbox.

7. An electrically controllable locking assembly for securing a door in a closed position in relation to a cabinet when installed therein, comprising:

a lock stud having at least one groove formed thereon;

a motor operatively connected to a rotatable shaft to effect rotation thereof;

a cam member mounted on the rotatable shaft for rotation therewith, the cam member including a cam surface; and a latch member having a first portion which is biased toward the lock stud and is positionable within the lock stud groove when the door is in a closed position, the latch member having a second portion which is biased toward the cam member and is positioned to contact at least a portion of the cam surface during rotation of the cam member.

8. The electrically controllable locking assembly of claim 7 wherein a slot is formed in the cam surface at a location therealong and the second portion of the latch member is configured for positioning within the cam member slot.

9. The electrically controllable locking assembly of claim 8 wherein, during an unlatching operation, the cam member rotates until the second portion of the latch member becomes positioned within the cam member slot preventing further rotation thereof.

10. The electrically controllable locking assembly of claim 7 wherein the lock stud comprises a lock barrel of a T-handle lock assembly.

11. An electrically controllable locking device comprising, a motor operatively connected to a shaft, the motor operable to effect rotation of the shaft; and a cam member mounted on the shaft for rotation therewith, the cam member including a cam surface having a slot formed at a position therealong.

12. The electrically controllable locking device of claim 11 wherein the cam member includes first and second sides, at least a portion of the cam surface being tapered from side to side.

13. The electrically controllable locking device of claim 11 further comprising a latch member including a portion biased toward the cam member and configured for positioning within the cam member slot.

14. The electrically controllable locking device of claim 13 further comprising a lock stud having at least one groove formed thereon, the latch member including a portion biased toward the lock stud and positioned within the lock stud groove when the locking device is in a locked arrangement.

* * * * *